United States Patent
Kim et al.

(10) Patent No.: US 8,149,835 B2
(45) Date of Patent: Apr. 3, 2012

(54) APPARATUS AND METHOD FOR COMMUNICATING MAC LAYER DATA IN BROADBAND WIRELESS COMMUNICATION SYSTEM

(75) Inventors: Nam-Gi Kim, Suwon-si (KR); Jung-Je Son, Seongnam-si (KR); Min-Hee Cho, Suwon-si (KR); Jae-Hyuk Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 819 days.

(21) Appl. No.: 11/765,801

(22) Filed: Jun. 20, 2007

(65) Prior Publication Data
US 2007/0297451 A1  Dec. 27, 2007

(30) Foreign Application Priority Data
Jun. 20, 2006  (KR) .................. 10-2006-0055246

(51) Int. Cl.
*H04L 12/28* (2006.01)
(52) U.S. Cl. .................. 370/392; 370/389; 370/474
(58) Field of Classification Search .................. 370/392, 370/474, 389
See application file for complete search history.

(56) References Cited

U.S. PATENT DOCUMENTS

| 6,477,669 | B1 * | 11/2002 | Agarwal et al. ............... 714/708 |
| 6,490,243 | B1 | 12/2002 | Tanaka et al. |
| 6,683,866 | B1 * | 1/2004 | Stanwood et al. ............ 370/350 |
| 6,954,891 | B1 * | 10/2005 | Jha .............................. 714/776 |
| 7,283,508 | B2 * | 10/2007 | Choi et al. .................... 370/341 |
| 2004/0125869 | A1 * | 7/2004 | May et al. ..................... 375/219 |
| 2008/0159416 | A1 * | 7/2008 | Melick et al. ................. 375/259 |
| 2008/0240011 | A1 * | 10/2008 | Kim et al. ..................... 370/312 |

FOREIGN PATENT DOCUMENTS
KR    1020050091600    9/2005

OTHER PUBLICATIONS
"Exploiting MAC flexibility in Wimax for media streaming" by Sengupta.*

* cited by examiner

*Primary Examiner* — Dang Ton
*Assistant Examiner* — Pamit Kaur
(74) *Attorney, Agent, or Firm* — The Farrell Law Firm, P.C.

(57) ABSTRACT

Provided is an apparatus and method for varying the length of an error check code of a PDU according to the length of a payload in a broadband wireless communication system. A transmitting apparatus includes a first generator and a second generator. The first generator generates a payload of a PDU. The second generator selects the length of an error check code according to the length of the generated payload, generates an error check code according to the selected length, and suffixes the error check code to the payload.

18 Claims, 7 Drawing Sheets

APPARATUS AND METHOD FOR COMMUNICATING MAC LAYER DATA IN BROADBAND WIRELESS COMMUNICATION SYSTEM

PRIORITY

This application claims priority under 35 U.S.C. §119 to an application entitled "Apparatus and Method for Communicating MAC Layer Data in Broadband Wireless Communication System" filed in the Korean Intellectual Property Office on Jun. 20, 2006 and assigned Serial No. 2006-55246, the contents of which are incorporated herein by reference.

BACKGROUND OF THE INVENTION

1. Field of the Invention

The present invention relates generally to an apparatus and method for communicating packets of a Media Access Control (MAC) layer in a broadband wireless communication system and in particular, to an apparatus and method for varying the length of an error check code of a PDU according to the length of a payload in a broadband wireless communication system.

2. Description of the Related Art

Several wireless communication technologies are currently proposed as viable candidates for high-speed mobile communication. Among the technologies, Orthogonal Frequency Division Multiplexing (OFDM) scheme is being considered as the most promising next-generation wireless communication technology. The OFDM scheme is expected to be used in most of the upcoming wireless communication technologies. The Wireless Metropolitan Area Network (WMAN) based on the Institute of Electrical and Electronics Engineers (IEEE) 802.16 called the $3.5^{th}$ generation (3.5G) technology is also adopting the OFDM scheme as the standard specification.

Wireless data communication may experience a data error depending on the conditions of wireless channels. Schemes for controlling and recovering such a data error can be broadly classified into an Automatic Repeat reQuest (ARQ) scheme and a Forward Error Correction (FEC) scheme. The ARQ scheme transmits a retransmission request for lost data from the receiving (RX) side to the transmitting (TX) side, and the FEC scheme corrects an error in lost data.

In the ARQ scheme, the results of error check (e.g., cyclic redundancy check (CRC)) for packets must be fed back from the RX side to the TX side. First, when the TX side initially transmits a packet, the RX side decodes the received packet. At this point, if there is no error, the RX side transmits an ACKnowledgement (ACK) signal to the TX side. On the other hand, if there is an error, the RX side transmits a Negative ACKnowledgement (NACK) signal to the TX side.

In general, a TX MAC layer converts a service data unit (SDU) received from an upper layer (e.g., an Internet Protocol (IP) layer) into a protocol data unit (PDU), and transfers the PDU to a physical layer. Then, the RX MAC layer converts the PDU received from the physical layer into an SDU, and transfers the SDU to the upper layer. At this point, for reliable transmission, the TX side generates and transmits a MAC PDU including a CRC code. Then, using the CRC code of the MAC PDU received from the TX side, the RX side checks whether there is an error. If there is an error, the RX side transmits a NACK signal for a retransmission request to the TX side.

FIG. 1 illustrates the PDU format of a MAC layer in a conventional broadband wireless communication system.

Referring to FIG. 1, a MAC PDU includes a payload carrying actual data, a generic MAC header prefixed to the payload, and a CRC code suffixed to the payload. The payload and the CRC code may not be included in some applications. However, the CRC code must be included for the application of a MAC ARQ.

FIG. 2 illustrates the format of the generic MAC header included in the MAC PDU.

Referring to FIG. 2, the generic MAC header includes an HT (Header Type) field used to write a header type, an EC (Encryption Control) field used to write encryption control information, a Type field used to write payload identifier information, a CI (CRC Indicator) field used to indicate the use or not of a CRC code, an EKS (Encryption Key Sequence) field used to write an encryption key sequence, an RSV (Reserved) field, a LEN (LENgth) field used to write the total length of the MAC PDU, a CID (Connection IDentifier) field used to write a CID, and an HCS (Header Check Sum) field used to write a check sum of the header.

Conventionally, the length of the CRC code of the MAC PDU is fixed at 4 bytes. However, when the CRC code length is fixed, the CRC code used is often too long even in a PDU with a short payload, such as a voice packet (e.g., a Voice-over-IP (VoIP) packet) and a Transmission Control Protocol (TCP) ACK signal. When the CRC code used is too long in relation to the length of the actual data (i.e., the payload), the overhead of the MAC layer is further increased. On the other hand, when the CRC code is too short in relation to the actual data length, error detection is performed incorrectly.

As described above, when the CRC code length is fixed regardless of the actual data length, various problems may arise.

SUMMARY OF THE INVENTION

An object of the present invention is to solve at least the above problems and/or disadvantages and to provide at least the advantages below. Accordingly, an object of the present invention is to provide an apparatus and method for varying the length of an error check code of a PDU according to the length of a payload in a broadband wireless communication system.

Another object of the present invention is to provide an apparatus and method for varying the length of a CRC code of a MAC PDU according to the length of a payload in a broadband wireless communication system.

According to one aspect of the present invention, a transmitting apparatus in a communication system includes a first generator for generating a payload of a PDU; and a second generator for selecting the length of an error check code according to the length of the generated payload, generating an error check code according to the selected length, and suffixing the error check code to the payload.

According to another aspect of the present invention, a receiving apparatus in a wireless communication system includes a header analyzer for detecting and analyzing a header of a received PDU; and an error checker for selecting the length of an error check code using PDU length data written in the header, and performing an error check on the PDU on the basis of the selected length.

According to still another aspect of the present invention, a transmitting method in a communication system includes generating a payload of a PDU; selecting the length of an error check code according to the length of the generated payload; and generating an error check code according to the selected length and suffixing the error check code to the payload.

According to even another aspect of the present invention, a receiving method in a wireless communication system includes detecting and analyzing a header of a received PDU; selecting the length of an error check code using PDU length data written in the header; and performing an error check on the PDU on the basis of the selected length.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Therefore, the terms used herein must be understood based on the descriptions made herein.

The present invention provides a scheme for varying the CRC code length of a MAC PDU in a broadband wireless communication system according to different payload lengths. The present invention predefines available CRC code lengths and selects one of the predefined CRC code lengths according to the payload length of the MAC PDU.

Figure 3:
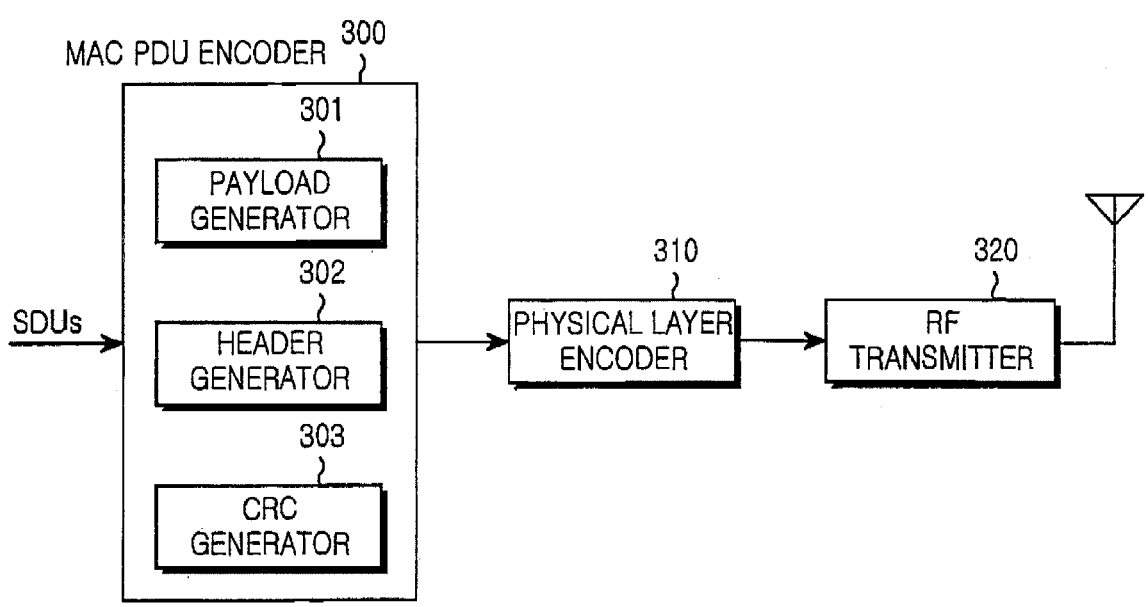
FIG. 3 is a block diagram of a transmitter in a broadband wireless communication system according to the present invention.

Referring to FIG. 3, the transmitter includes a MAC PDU encoder 300, a physical layer encoder 310, and a radio-frequency (RF) transmitter 320. MAC PDU encoder 300 includes a payload generator 301, a header generator 302, and a CRC generator 303. The transmitter is a relative term and may be a base station (BS) or a terminal.

MAC PDU encoder 300 packs or segments SDUs received from an upper layer, thereby generating and outputting a MAC PDU. According to the present invention, MAC PDU encoder 300 selects a CRC code length (hereinafter a CRC length) corresponding to the length of a payload of the MAC PDU, generates a CRC code corresponding to the selected CRC length, and prefixes/suffixes a MAC header/the CRC code to the payload, thereby generating the MAC PDU.

Figure 1:
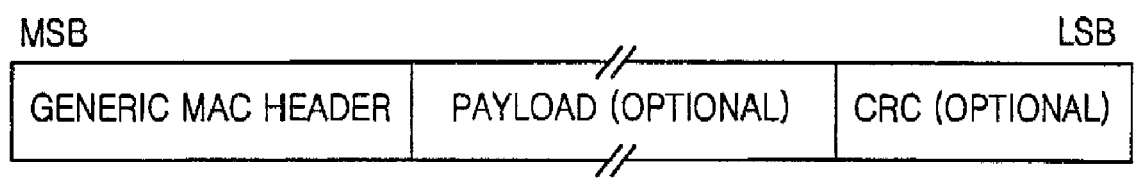
FIG. 1 shows the PDU format of a MAC layer in a conventional broadband wireless communication system.
Figure 2:
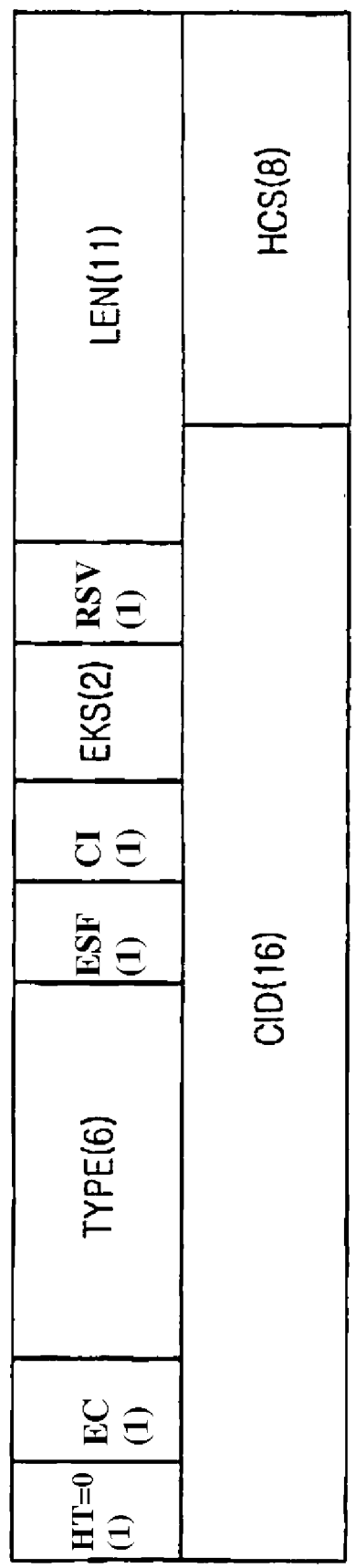
FIG. 2 shows the header format of a MAC PDU in the conventional broadband wireless communication system.

In detail, payload generator 301 of MAC PDU encoder 300 packs or segments the received SDUs to generate the payload of the MAC PDU. The length of the generated payload is variable. Header generator 302 generates the MAC header (a generic MAC header) for the payload and prefixes the generated MAC header to the payload. The MAC header may contain the data illustrated in FIG. 2. CRC generator 303 has a lookup table for storing the mapping relationship between payload length and CRC length. Accordingly, CRC generator 303 obtains the CRC length corresponding to the payload length from the lookup table, generates the CRC code for the payload according to the obtained CRC length, and suffixes the generated CRC code to the payload.

Physical layer encoder 310 encodes the MAC PDU received from MAC PDU encoder 300, thereby generating a baseband digital signal. Physical layer encoder 310 may include a channel encoding block and a modulation block. In the case of an OFDM system, the channel encoding block may include a channel encoder, an interleaver, and a modulator, and the modulation block may include an Inverse Fast Fourier Transform (IFFT) processor for carrying TX data on a plurality of orthogonal subcarriers.

RF transmitter 320 converts the baseband digital signal received from physical layer encoder 310 into a baseband analog signal, converts the baseband analog signal into an RF signal, and transmits the RF signal through an antenna.

Figure 4:
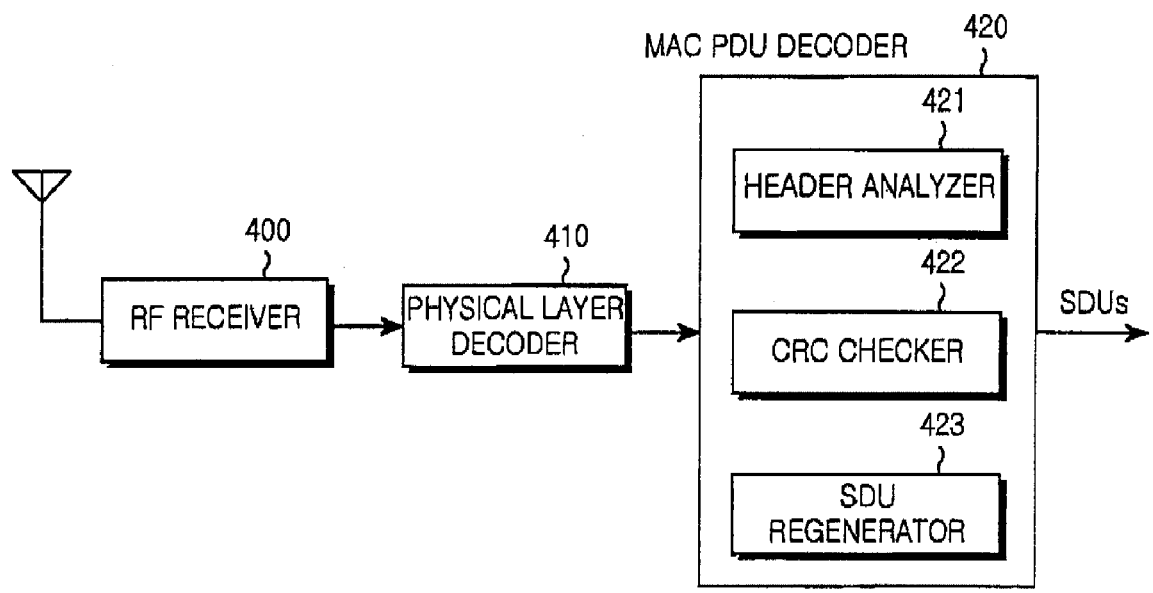
FIG. 4 is a block diagram of a receiver in the broadband wireless communication system according to the present invention.

Referring to FIG. 4, the receiver includes an RF receiver 400, a physical layer decoder 410, and a MAC PDU decoder 420. MAC PDU decoder 420 includes a header analyzer 421, a CRC checker 422, and an SDU regenerator 423. The receiver is a relative term and may be a base station (BS) or a terminal.

RF receiver 400 converts an RF signal received through an antenna into a baseband analog signal, and converts the baseband analog signal into a baseband digital signal.

Physical layer decoder 410 decodes the baseband digital signal received from RF receiver 400 to obtain original information data, and transfers the original information data to MAC PDU decoder 420. Physical layer decoder 410 may include a demodulation block and a channel decoding block. In the case of an OFDM system, the demodulation block may include an FFT processor for extracting data carried on each subcarrier, and the channel decoding block may include a demodulator, a deinterleaver, and a channel decoder.

MAC PDU decoder 420 regenerates MAC PDUs received from physical layer decoder 410 into an SDU, and transfers the SDU to an upper layer. According to the present invention, MAC PDU decoder 420 detects a MAC header from the received MAC PDU, determines a CRC length using MAC PDU length data written in the MAC header, and performs a CRC check on the MAC PDU on the basis of the determined CRC length.

In detail, header analyzer 421 of MAC PDU decoder 420 detects and analyzes the MAC header of the received MAC PDU. At this point, on the basis of a CI (CRC indicator) field in the MAC header, header analyzer 421 determines whether there is a CRC field. If there is a CRC field, header analyzer 421 provides MAC PDU length data in the MAC header to CRC checker 422.

CRC checker 422 has a lookup table for storing the mapping relationship between MAC PDU length and CRC length. Accordingly, CRC checker 422 determines a CRC length using the length data received from header analyzer 421, and detects a CRC code from the MAC PDU using the determined CRC length. In addition, CRC checker 422 generates a CRC code corresponding to the determined CRC length with respect to the payload of the MAC PDU, and compares the generated CRC code with the detected CRC code to determine whether there is an error. If there is no error, the payload of the MAC PDU is provided to SDU regenerator 423. On the other hand, if there is an error, the MAC PDU is discarded and a NACK signal for the corresponding MAC PDU is fed back to the transmitter.

SDU regenerator 423 regenerates an SDU using the payloads of errorless MAC PDUs, and transfers the regenerated SDU to an upper layer (e.g., an IP layer).

An example of the TX side lookup table and the RX side look table described with reference to FIGS. 3 and 4 are shown in Table 1 below.

TABLE 1

| Payload Length/MAC PDU Length | CRC Length |
|---|---|
| Smaller than 128 bytes | 1 byte |
| Equal to or greater than 128 bytes and smaller than 512 bytes | 2 bytes |
| Equal to or greater than 512 bytes | 4 bytes |

Referring to Table 1, the CRC lengths are classified into three levels: 1 byte, 2 bytes, and 4 bytes. It will be understood by those skilled in the art that the CRC lengths may be classified into any number of levels. When the payload (or MAC PDU) length is smaller than 128 bytes, the CRC code may have a length of 1 byte. When the payload length is equal to or greater than 128 bytes and smaller than 512 bytes, the CRC code may have a length of 2 bytes. When the payload length is equal to or greater than 512 bytes, the CRC code may have a length of 4 bytes.

Figure 5:
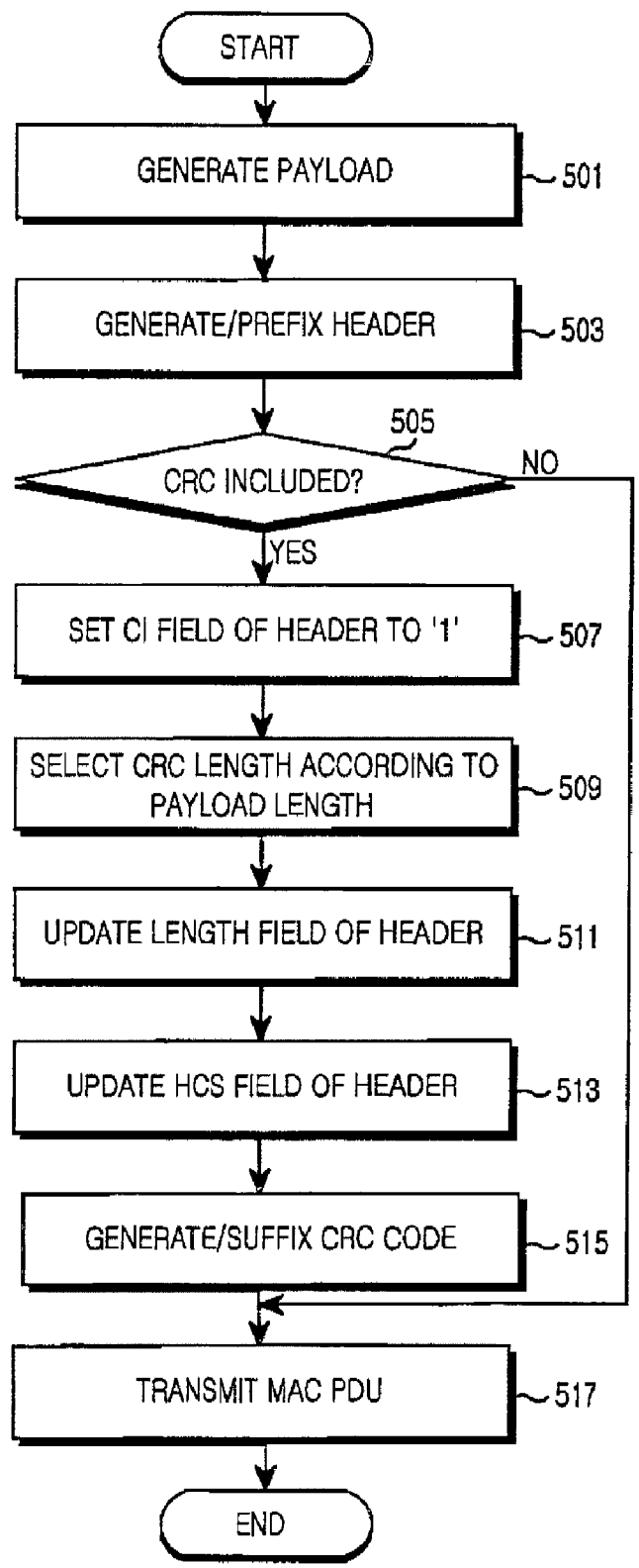
FIG. 5 is a flowchart of an operation of the transmitter in the broadband wireless communication system according to the present invention.

Referring to FIG. 5, in step 501, the transmitter packs or segments SDUs generated by an upper layer (e.g., an IP layer) to generate a payload of a MAC PDU. In step 503, the transmitter generates a MAC header for the payload and prefixes the generated MAC header to the payload. The MAC header may contain the data illustrated in FIG. 2.

In step 505, the transmitter determines whether a CRC field is included in the MAC PDU. This determination may be performed using system operating parameters. If a CRC field is included in the MAC PDU, the operation proceeds to step 507; and if not, the operation proceeds directly to step 517. In step 517, the transmitter processes the generated MAC PDU (including the MAC header and the payload) into the format transmittable at a physical layer and transmits the resulting data to the receiver.

In step 507, the transmitter sets a CI field of the MAC header to '1'. In step 509, the transmitter selects a CRC length on the basis of the payload length. As described above, the transmitter has a lookup table for storing the mapping relationship between payload length and CRC length as shown in Table 1, and selects the CRC length on the basis of the lookup table.

In step 511, the transmitter adds all of the MAC header length, the payload length, and the CRC length, and updates a Length field of the MAC header to the addition value. In this way, all the necessary data are written in the MAC header. In step 513, the transmitter calculates a check sum using the data written in the MAC header, and updates an HCS field of the MAC header to the check sum value.

In step 515, the transmitter generates a CRC code corresponding to the CRC length with respect to the payload and suffixes the generated CRC code to the payload, thereby generating a MAC PDU including the MAC header, the payload, and the CRC code. In step 517, the transmitter processes the generated MAC PDU into the required format for the physical layer and transmits the resulting data to the receiver.

Figure 6:
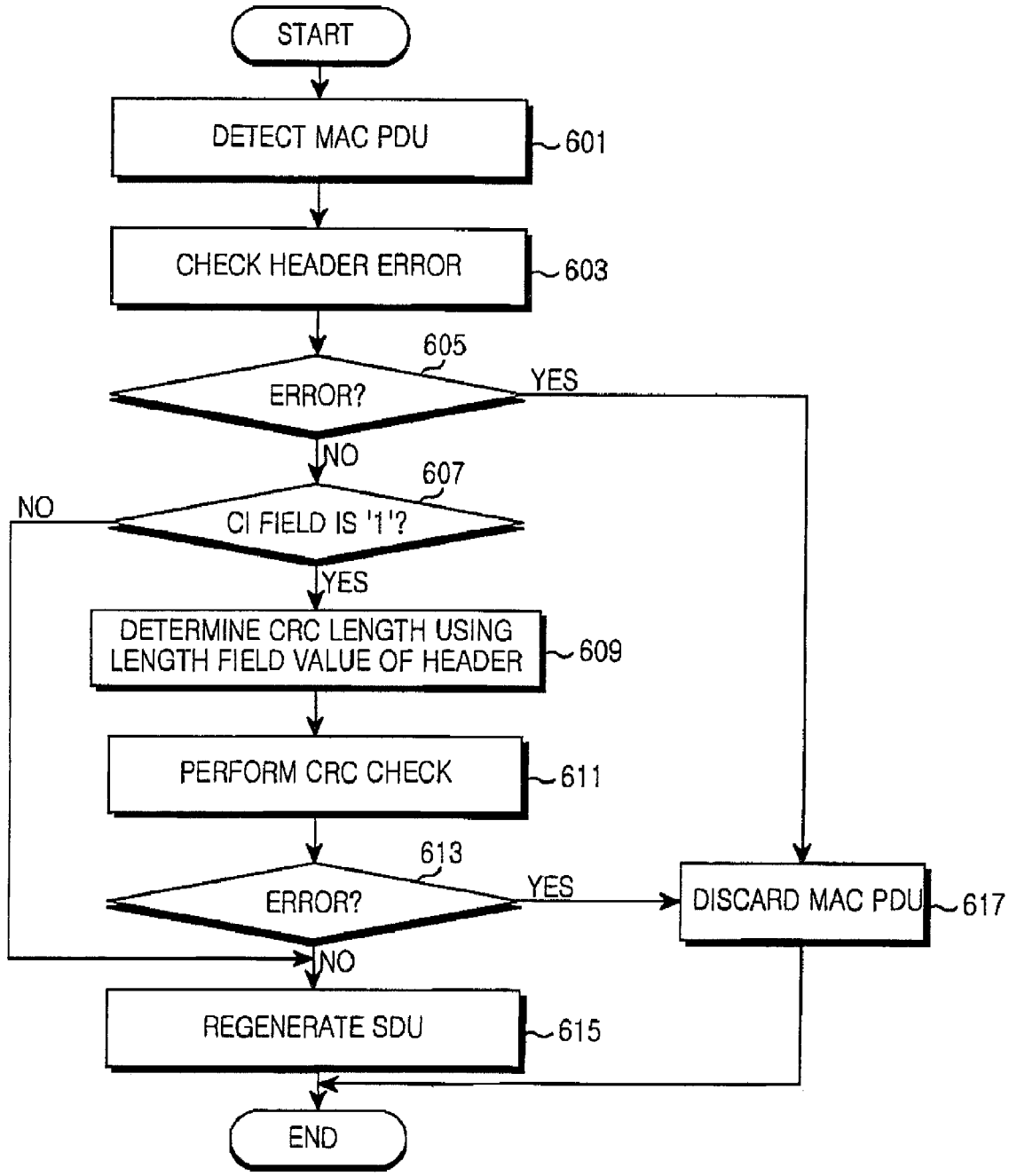
FIG. 6 is a flowchart of an operation of the receiver in the broadband wireless communication system according to the present invention.

Referring to FIG. 6, in step 601, the receiver decodes an RX signal and detects a MAC PDU from the decoded signal. In step 603, the receiver detects a MAC header from the MAC PDU and performs a header error check using a check sum value written in the HCS field of the MAC header. In step 605, the receiver determines if there is an error in the MAC header. If there is an error in the MAC header, the operation proceeds to step 617; and if not the operation proceeds to step 607. In step 617, the receiver discards the MAC PDU.

In step 607, the receiver checks the CI field in the MAC header to determine whether a CRC field (or a CRC code) is included in the MAC PDU. If a CRC field is included in the MAC PDU, the operation proceeds to step 609; and if not, the operation proceeds to step 615. In step 615, the receiver regenerates an SDU using a payload of the MAC PDU. The regenerated SDU is processed at an upper layer of a MAC layer.

In step 609, the receiver determines a CRC length using MAC PDU length data written in a Length field of the MAC header. As described above, the receiver has a lookup table for storing the mapping relationship between MAC PDU length and CRC length as shown in Table 1, and determines the CRC length on the basis of the lookup table.

In step 611, the receiver detects the CRC length and the CRC code from the MAC PDU, calculates the CRC code corresponding to the CRC length with respect to the payload of the MAC PDU, and performs a CRC check to compare the calculated CRC code with the detected CRC code.

In step 613, the receiver determines if the CRC check is successful, that is, whether there is an error in the payload of the MAC PDU. If there is an error in the payload, the operation proceeds to step 617; and if not, the operation proceeds to step 615. In step 617, the receiver discards the MAC PDU. In step 615, the receiver regenerates an SDU using the payload of the MAC PDU. The regenerated MAC PDU is processed at the upper layer of the MAC layer.

Figure 7:
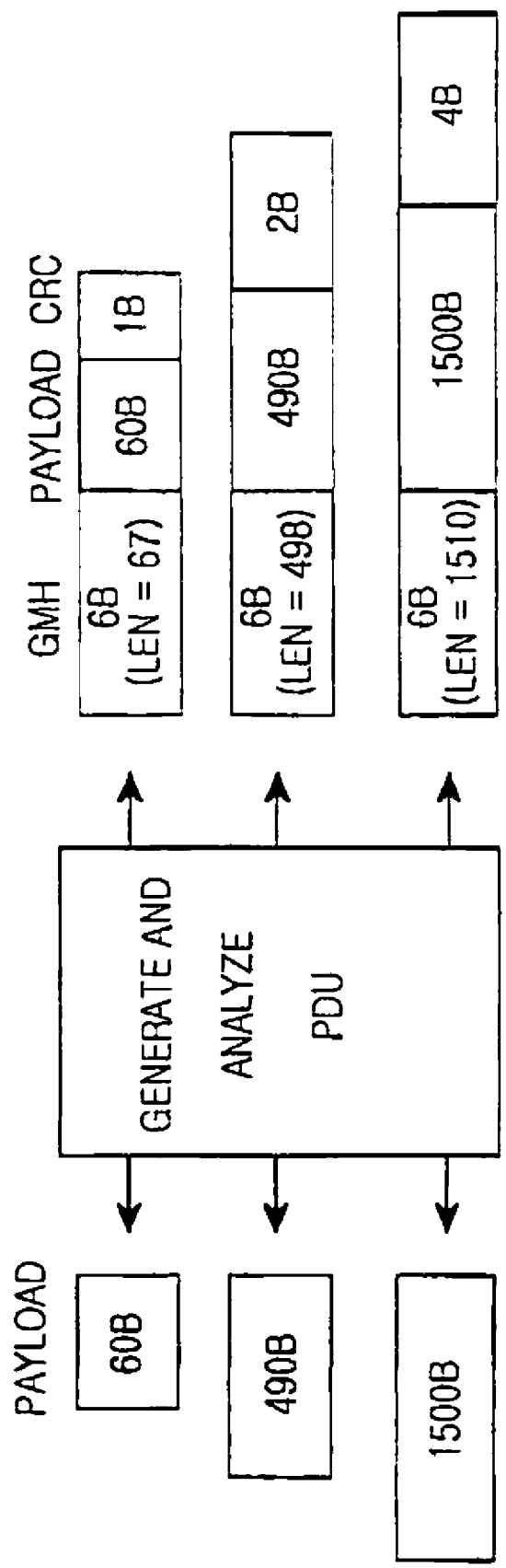
FIG. 7 illustrates an application example of variable CRC code lengths according to the present invention.

That is, FIG. 7 illustrates an application example according to Table 1, in which the CRC lengths are classified into three levels: 1 byte, 2 bytes, and 4 bytes. When the payload (or MAC PDU) length is smaller than 128 bytes, the CRC code may have a length of 1 byte. When the payload length is equal to or greater than 128 bytes and smaller than 512 bytes, the CRC code may have a length of 2 bytes. When the payload length is equal to or greater than 512 bytes, the CRC code may have a length of 4 bytes.

A MAC PDU is generated at the TX side as follows: When the length of the payload is 60 bytes (smaller than 128 bytes), the TX side uses a 1-byte CRC code to generate a MAC PDU with a total length of 67 bytes. When the length of a payload is 490 bytes, the TX side uses a 2-byte CRC code to generate a MAC PDU with a total length of 498 bytes. When the length of a payload is 1500 bytes, the TX side uses a 4-byte CRC code to generate a MAC PDU with a total length of 1510 bytes.

A MAC PDU is analyzed at the RX side as follows: When the length LEN of a received MAC PDU is 67 bytes (smaller than 128 bytes), the RX side recognizes the length of a CRC code as '1 byte' and removes a 1-byte CRC code and a 6-byte MAC header from the MAC PDU to detect a 60-byte payload. When the length LEN of a received MAC PDU is 498 bytes, the RX side recognizes the length of a CRC code as '2 byte' and removes a 2-byte CRC code and a 6-byte MAC header from the MAC PDU to detect a 490-byte payload. When the length LEN of a received MAC PDU is 1510 bytes, the RX side recognizes the length of a CRC code as '4 byte' and removes a 4-byte CRC code and a 6-byte MAC header from the MAC PDU to detect a 1500-byte payload.

As described above, the present invention adjusts the CRC length according to the payload (MAC PDU) length, thereby making it possible to reduce the unnecessary CRC calculation and overhead caused by the PDU generation and analysis. In this way, because the present invention adjusts the CRC length adaptively, it can maintain the error detection capability at a predetermined level or higher while reducing the CRC calculation amount.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitting apparatus in a communication system, comprising:
   a first generator for generating a payload of a protocol data unit (PDU);
   a second generator for selecting a length of an error check code according to a length of the generated payload, generating an error check code according to the selected length, and suffixing the error check code to the payload;
   a third generator for generating a header for the generated payload and prefixing the header to the payload;
   an encoder for encoding according to physical layer requirements, the PDU including the payload, the header prefixed to the payload, and the error check code suffixed to the payload; and
   a radio-frequency (RF) transmitter for converting data received from the encoder into an RF signal and transmitting the RF signal,
   wherein the second generator includes a lookup table for storing a mapping relationship between payload length and error check code length, and
   wherein, in the lookup table, an error check code length corresponding a payload length N is greater than or equal to an error check code length corresponding a payload length M, where N is greater than M.

2. The transmitting apparatus of claim 1, wherein the PDU comprises a packet of a Media Access Control (MAC) layer.

3. The transmitting apparatus of claim 1, wherein the error check code comprises a cyclic redundancy check (CRC) code.

4. A receiving apparatus in a wireless communication system, comprising:
   a radio-frequency (RF) receiver for converting a received RF signal into a baseband signal;
   a decoder for decoding according to requirements of a physical layer, the baseband signal from the RF receiver to generate protocol data unit (PDU);
   a header analyzer for detecting and analyzing a header of the PDU; and
   an error checker for selecting a length of an error check code using PDU length data written in the header, and performing an error check on the PDU according to the selected length,
   wherein the error checker includes a lookup table for storing a mapping relationship between PDU length and error check code length, and
   wherein, in the lookup table, an error check code length corresponding a PDU length N is greater than or equal to an error check code length corresponding a PDU length M, where N is greater than M.

5. The receiving apparatus of claim 4, further comprising a regenerator for regenerating, when there is no error in the PDU, a service data unit (SDU) using a payload of the PDU and transferring the regenerated SDU to an upper layer.

6. The receiving apparatus of claim 4, wherein the PDU comprises a packet of a Media Access Control (MAC) layer.

7. The receiving apparatus of claim 4, wherein the error check code comprises a cyclic redundancy check (CRC) code.

8. The receiving apparatus of claim 4, wherein the error checker detects a CRC code with the selected length from the PDU, generates a CRC code with a predetermined length with respect to a payload of the PDU, and compares the generated CRC code with the detected CRC code to perform the error check.

9. A transmitting method in a communication system, comprising:
   generating a protocol data unit (PDU) payload;
   selecting a length of an error check code according to a length of the generated payload;
   generating an error check code according to the selected length and suffixing the error check code to the PDU payload;
   generating a header for the generated payload and prefixing the header to the PDU payload;
   encoding, according to physical layer requirements, the PDU including the PDU payload, the header prefixed to the PDU payload, and the error check code suffixed to the PDU payload;
   converting the physical layer encoded data into a radio-frequency (RF) signal; and
   transmitting the RF signal,
   wherein the length of the error check code is selected using a lookup table storing a mapping relationship between payload length and error check code length, and
   wherein, in the lookup table, an error check code length corresponding a payload length N is greater than or equal to an error check code length corresponding a payload length M, where N is greater than M.

10. The transmitting method of claim 9, wherein the PDU includes a packet of a Media Access Control (MAC) layer.

11. The transmitting method of claim 9, wherein the error check code includes a cyclic redundancy check (CRC) code.

12. A receiving method in a wireless communication system, comprising:
   converting a received radio-frequency (RF) signal into a baseband signal;
   decoding, according to physical layer requirements, the baseband signal to generate a protocol data unit (PDU);
   detecting and analyzing a header of the PDU;
   selecting a length of an error check code using PDU length data written in the header; and
   performing an error check on the PDU according to the selected length,
   wherein the length of the error check code is selected using a lookup table storing a mapping relationship between PDU length and error check code length, and
   wherein, in the lookup table, an error check code length corresponding a PDU length N is greater than or equal to an error check code length corresponding a PDU length M, where N is greater than M.

13. The receiving method of claim 12, further comprising:
   regenerating, when there is no error in the PDU, a service data unit (SDU) using a payload of the PDU; and
   transferring the regenerated SDU to an upper layer.

14. The receiving method of claim 12, wherein the PDU includes a packet of a Media Access Control (MAC) layer.

15. The receiving method of claim 12, wherein the error check code includes a cyclic redundancy check (CRC) code.

16. The receiving method of claim 12, wherein performing the error check comprises:
   detecting a CRC code with the selected length from the PDU;

generating a CRC code with a predetermined length with respect to a payload of the PDU; and comparing the generated CRC code with the detected CRC code to determine whether there is an error.

17. A transmitting apparatus in a wireless communication system, comprising:
- a first generator for generating a payload of a Media Access Control (MAC) layer packet; and
- a second generator for selecting a length of a cyclic redundancy check (CRC) code according to a length of the generated payload, and generating the CRC code according to the length of the CRC code,
- wherein the second generator comprises a memory table for storing a mapping relationship between payload length and cyclic redundancy code length, and
- wherein, in the memory table, a cyclic redundancy code length corresponding a payload length N is greater than or equal to a cyclic redundancy code length corresponding a payload length M, where N is greater than M.

18. A receiving apparatus in a wireless communication system, comprising:
- a detector for detecting a length of a received Media Access Control (MAC) layer packet; and
- an error checker for selecting a cyclic redundancy check (CRC) code according to the detected length, and performing an error check on the packet using the selected CRC code,
- wherein the error checker comprises a memory table for storing a mapping relationship between packet length and cyclic redundancy code length, and wherein, in the memory table, a cyclic redundancy code length corresponding a payload length N is greater than or equal to a cyclic redundancy code length corresponding a payload length M, where N is greater than M.

* * * * *